May 30, 1961 W. E. WOLF 2,986,050
BORING MACHINE MOUNTING FIXTURE
Filed Dec. 1, 1958 2 Sheets-Sheet 2
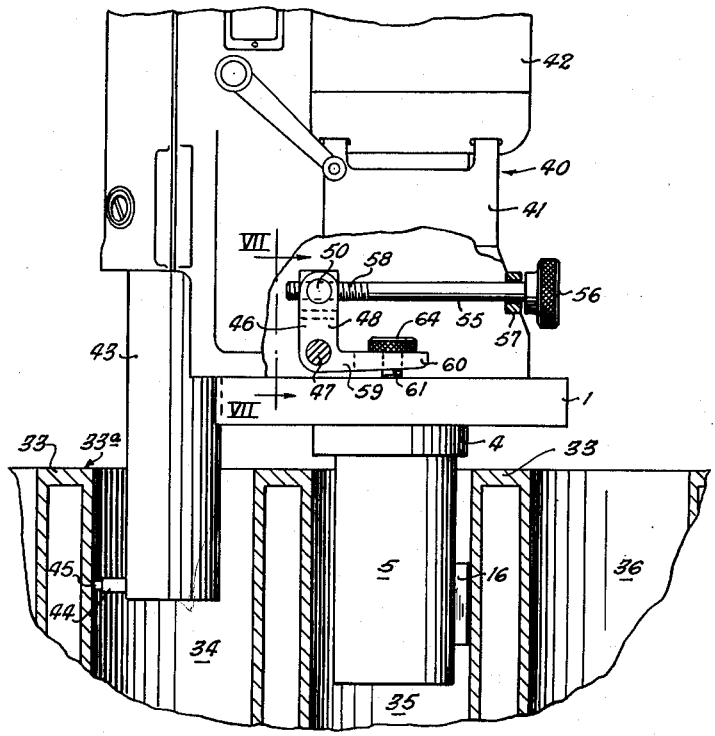
Fig. VI
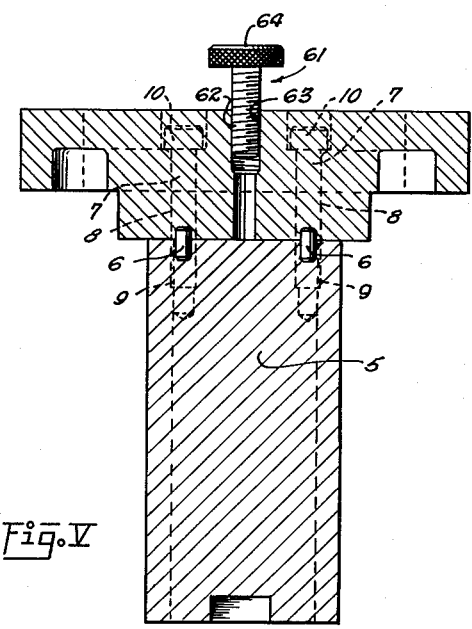
Fig. V
Fig. VII
INVENTOR
William E. Wolf
BY Austin Mier and
Howard E. Moore
ATTORNEYS United States Patent Office 2,986,050
Patented May 30, 1961

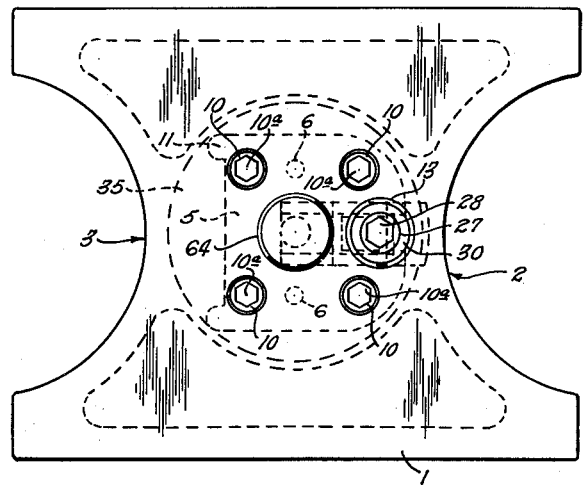

2,986,050
BORING MACHINE MOUNTING FIXTURE
William E. Wolf, Dallas, Tex., assignor to Storm-Vulcan, Inc., Dallas, Tex., a corporation of Minnesota
Filed Dec. 1, 1958, Ser. No. 777,263
11 Claims. (Cl. 77—2)

This invention is concerned with a device for mounting a cylinder boring machine on an engine block for reboring the cylinder bores therein.

As is well known in the art, it is often necessary to rebore the cylinder bores in internal combustion engines due to the fact that the upper portions of such bores become worn to such an extent that a clearance is provided between the piston rings and the bore, permitting oil to flow thereby.

Heretofore it has been the practice to rebore such cylinder bores either by mounting a boring machine directly to the upper face of the engine block, or by the use of a mounting plate which is attached to the cylinder head mounting surface, or upper face of the engine block by means of bolts which pass through such plate and into the bolt holes provided in the cylinder block for mounting the cylinder head thereon. When the mounting plate was employed, a clamp-down screw was customarily provided on the upper face of the mounting plate, and the boring machine carried a hold-down clamp which was adjustably attached to the hold-down screw so that the boring machine shaft or spindle could be centered in the cylinder bore to be bored.

Such a mounting device uses the face of the engine block as a reference surface for aligning the boring machine spindle axis with the cylinder bore axis, and presents no particular problem on engines having an upper face on the block which is flat and perpendicular to the axis of the cylinder bores.

However, in recent years automobile engine blocks have been made with cylinder head mounting surfaces which are angularly disposed in their relationship to the vertical axis of the cylinder bore, so that the mounting surface was not perpendicular to the axis of the bore, and due to allowable manufacturing tolerances assumed by various engine manufacturers, the relationship between the axis of the cylinder bores and the angularly disposed cylinder block faces are not uniform.

Therefore, a conventional boring machine mounting plate secured to such angularly disposed face would not insure that the axis of the boring machine spindle would be parallel to the axis of the cylinder bores. Attempts have been made to solve this problem by machining the faces of such mounting plates in coinciding angular relationship to the cylinder block face but due to the variation in the angle of such faces with relation to the axis of the cylinder bores in various types of engines, such has not been satisfactory.

The present invention is intended to provide a boring machine mounting fixture which uses one of the cylinder bores as a reference point for aligning the spindle of the boring machine with a cylinder bore to cause the mounting plate thereon to be disposed in proper angular relationship to the engine block face so that when the boring machine is mounted on such plate the axis of the spindle thereon will be disposed in parallel relationship to the axis of the cylinder bores. By the use of such device, the mounting fixture is adapted for mounting on any type of engine, regardless of the angular disposition of the engine block face with relation to the cylinder bores so that when the boring machine is mounted thereon the axis of the spindle will be in parallel relationship to the axis of the bores.

It is therefore a primary object of this invention to provide a boring machine mounting fixture which employs one of the cylinder bores as a reference point for aligning the boring spindle in another bore so as to cause the mounting plate thereon to be disposed in proper angular relationship to the face of the engine block to center and align the spindle in the bore.

It is another object of this invention to provide a boring machine mounting fixture having a depending body portion extendable into a cylinder bore and having means carried thereby which will wedge the depending portion in the cylinder bore in parallel relationship to the axis of the bore so that the plate, carried at the upper end of the depending body portion, will be disposed in proper angular relationship to the face of the cylinder block to cause the spindle of a boring machine mounted thereon to be in axial alignment with the cylinder bore.

A still further object of the invention is to provide a mounting fixture for a boring machine which may be attached to, and wedged in place, with relation to the upper face of the cylinder block without the necessity of bolting same to the cylinder block.

Still another object of the invention is to provide a mounting fixture for a boring machine wherein two cylinder bores can be bored upon one setting of the fixture.

Another object of the invention is to provide a mounting fixture for a boring machine which permits the quick and easy mounting and adjustment of the fixture on the engine block, and the quick and easy mounting and adjustment of the boring machine with relation to the mounting plate on the fixture.

Other and further objects of the invention will become apparent upon reading the detailed specification hereinafter following and by referring to the drawings annexed hereto.

A suitable embodiment for carrying out my invention is shown in the attached drawings wherein:

Figure I is a top plan view of the boring machine mounting fixture;

Figure II is a vertical sectionalized view of the mounting fixture;

Figure III is a transverse sectionalized view taken on the line III—III of Figure II;

Figure IV is a transverse sectionalized view taken on the line IV—IV of Figure II;

Figure V is a vertical sectionalized view taken on the line V—V of Figure II;

Figure VI is a fragmentary side elevational view of a typical boring machine mounted on the mounting fixture, which mounting fixture is positioned on an engine block, shown in cross section, and showing the hold-down device attaching the boring machine to the plate mounted at the upper end of the mounting fixture; and Figure VII is a fragmentary end elevational view of the hold-down device for attaching the boring machine to the mounting fixture.

Numeral references are employed to indicate the various parts of the devices shown in the drawings, and like numerals indicate like parts throughout the various figures of the drawings.

The boring machine mounting fixture includes a flat plate or platform 1 which has semi-circular recesses 2 and 3 formed in opposite ends thereof. The recesses 2 and 3 are arranged to embrace the spindle of the boring machine and partially encircle the opening of the cylinder bores to provide a clearance for centering the spindle in the cylinder bore when the boring machine is mounted on the plate 1 in the manner hereinafter described.

A circular reinforcing extension 4 is provided on the lower edge of the plate 1, and a depending body 5 is secured to such extension 4 by means of a plurality of cap screws 7, which pass through passages 8, provided through the plate 1 and extension 4, and are threaded into recesses 9 provided in the upper face of the body 5.

In assembling the plate 1 with the body 5, dowel pins 6 are inserted in corresponding recesses in the upper face of the body 5 and the lower face of the extension 4 so as to align the passages 8 with the recesses 9 to receive the cap screws 7. The upper ends of the cap screws 7 are provided with enlarged heads 10 which are counter-sunk in the upper face of the plate 1, such heads 10 being provided with wrench engaging recesses 10a to receive a wrench for tightening down the cap screws 7.

The body 5 is provided with spaced longitudinal bosses 11 on one face thereof, said bosses being arranged to engage the inner surface of a cylinder bore when wedged thereagainst by the wedge mechanism as hereinafter described.

A vertical bore 12 is provided through the plate 1 and extension 4, said bore being terminated at the upper end by an enlarged counter-bore 13.

A channel 14 is formed in a face of the body 5, said channel being terminated at its lower end by inclined surfaces 15 on each side thereof.

A wedge shoe 16 is disposed in the lower end of the channel 14, said wedge shoe having a rounded outer face 17 thereon arranged to contact the inner face of a cylinder bore.

The shoe 16 is provided with a slot 18 on the inner face thereof which forms spaced sides 19 and 20, having parallel tapered surfaces 21 on the outer faces thereof. The surfaces 21 are arranged to coincide with the inclined surfaces 15 in the channel 14, and such coinciding surfaces 21 and 15 are slidably related to provide a cam action to move the shoe 16 outwardly when it is moved upwardly along such cam surfaces in the manner hereinafter described. A pivot pin 22 is pivotally mounted in passages provided in the spaced sides 19 and 20, as indicated at 23. The pivot pin 22 has a threaded passage 24 therethrough which threadedly receives the threaded portion 26 of the lead screw 25.

The lead screw 25 has an enlarged head 27 thereon which is provided with a hexed wrench engaging recess 28 in the upper face thereof whereby the lead screw 25 may be rotated for actuating the wedge shoe 16. The lead screw 25 is suspended in the counter bore 13 on a washer 29 and a bushing washer 30, interposed between the washer 29 and the head 27. The bushing washer 30 has a convex surface 31 thereon which contacts, and coincides with, a corresponding recess 32 on the upper face of the washer 29. Thereby the corresponding conical surfaces on the washers provide a bearing surface and a pivot for the lead screw 25 as it is rotated to move the wedge shoe 16 outwardly along the tapered surfaces 21 and 15.

It will be noted that the passage 12 is considerably larger in diameter than the stem of the screw 25, to thereby permit the stem of such screw to move laterally on the pivoted head 27 as the wedge 16 is moved laterally by rotation of the screw 25.

As previously stated, the threaded portion 26 of the lead screw 25 is threadedly engaged with the threaded passage 24 through the pivot pin 22 so that upon rotation of the lead screw 25 in a clockwise direction the shoe 16 is caused to slide upwardly along the corresponding tapered surfaces 21 and 15, and to move outwardly of the channel 14, and when the screw 25 is rotated in the opposite direction the shoe 16 is allowed to move downwardly and recede into the channel 14.

A fragmentary section of a typical cylinder block 33 is shown in Figure VI wherein there is shown three cylinder bores 34, 35 and 36. As explained above, the upper face 33a of the cylinder block 33 may be angularly disposed with relation to the vertical axis of the cylinder block and the axes of the bores 34, 35 and 36 may be disposed at an angle other than perpendicular with relation to the face 33a of the cylinder block. Even though the mounting fixture is particularly advantageous in mounting a boring machine on an engine block having angularly disposed faces, with cylinder bores therein with axes which are not perpendicular to the face of the cylinder block, it will be understood that the mounting fixture described herein would have utility and advantage when mounted on an engine block having an upper face which is perpendicular to the axis of the cylinder bores.

The mounting fixture is secured to the cylinder block 33 by inserting the depending body 5 in one of the cylinder bores. As shown in Figure VI, the body is inserted in the cylinder bore 35. After being so inserted in the cylinder bore the lead screw 25 is rotated in a clockwise direction so as to cause the shoe 16 to move upwardly along the cam surfaces 21 and 15 and outwardly of the channel 14. The face 17 of the wedge shoe 16 contacts the inner face of the cylinder bore 35 and upon continued rotation of the lead screw 25, presses the bosses 11 against the opposite wall of the cylinder bore and wedges the body 5 in the cylinder bore. In such position the axis of the body 5 is in parallel alignment with the axis of the cylinder bore. The upper face of the plate 1, which is perpendicular to the axis of the body 5, is also perpendicular to the axis of the cylinder bores 34, 35 and 36 so that when the boring machine, indicated generally at 40, is mounted on the upper face of the plate 1, the spindle 43 of the boring machine is in axial alignment with the cylinder bore 34 or 36, as the case may be.

The cylinder boring machine 40 is of conventional construction, and well known in the art. It includes a frame 41, having an electric motor 42 mounted thereon, which through appropriate gearing arrangement (not shown) rotates the spindle 43 to bore the cylinder bore in which the spindle is disposed. The spindle 43 has mounted thereon a conventional fly cutter, having a cutting tip 45, which is made of tungsten carbide or some other hard cutting material.

The boring machine 40 is mounted on the upper face of the plate 1 by means of a hold-down device which incudes an L-shaped clamp 46 which is pivotally mounted to the frame 41 by means of a pivot pin 47. The pivot pin 47 has opposite ends pivotally mounted to said frame 41.

The clamp 46 includes an upstanding leg 48 having a slot 49 formed therein, providing oppositely disposed walls 51. A pivot member 50 is pivotally mounted at each end in passages provided in the spaced walls 51, as indicated at 52. The pivot member 50 includes an enlarged circular portion 53 having a threaded passage 54 therethrough.

An adjustment screw 55, having an enlarged, knurled head 56 thereon, passes through, and is abutted against, a mounting bar 57 which is secured to the frame 41. The adjustment screw 55 has a threaded end 58 thereon which is threaded through the threaded passage 54, provided through the enlarged portion 53 of the pivot member 50.

The clamp 46 has a laterally extending leg 59 thereon which is bifurcated, as indicated at 60. The bifurcated portion 60 is arranged to straddle the hold-down screw 61, which is threadedly engaged in the upper face of the plate 1, as shown in Figure III. The hold-down screw 61 has a threaded shank 62 thereon which is threaded into a correspondingly threaded passage 63 provided in the upper face of the plate 1, and is terminated at the upper end by an enlarged knurled head 64 which is engaged by the bifurcated legs 60 on the clamp 46. The slot provided between the bifurcated legs 60 is elongated to permit lateral adjustment of the boring machine 42 with relation to the plate 1 to thereby permit the spindle 43 to be centered in the cylinder bore 34 before securing the boring machine 40 in fixed position with relation to the plate 1.

To mount the boring machine on the plate 1, the bifurcated portion 60 is extended about the shank portion 62 of the holddown screw 61, with the spindle 43 extending into the cylinder bore 34. The boring machine 40 is then shifted laterally until the spindle 43 is centered in the cylinder bore 34, such centering being accomplished by a conventional gauge device (not shown), well known in the art. When the spindle 43 has thus been centered in the cylinder bore 34, the adjustment screw 55 is rotated counter-clockwise to cause the pivot member 50 to move outwardly along the threaded portion 58 and thus pivot the clamp 46 about the pivot pin 47 and bring the sides of the bifurcated leg 60 into engagement with the head 64. When the screw has thus been tightened, the boring machine 40 is rigidly mounted to the plate 1 and the boring machine is thus in position to bore the cylinder bore 34.

It will be noted that both the cylinder bores 34 and 36 may be bored with a single positioning of the mounting fixture. This may be accomplished by simply disengaging the clamp 46 from the hold-down screw 61 and turning the boring machine 40 around so that the spindle 43 will pass into the cylinder bore 36. It may then be centered in the bore 36, and the boring machine clamped to the plate 1, in the manner already described.

It is believed that the operation and function of the novel boring machine mounting fixture is apparent from the foregoing description, and that further description is unnecessary.

It will thus be seen that I have provided a boring machine mounting fixture which may be quickly and easily mounted in a cylinder bore in position so that when the boring machine is mounted thereon the spindle of the boring machine will be in axial alignment with the cylinder bores regardless of the angular relationship between the axis of the cylinder bores and the face of the cylinder block, whereby such fixture may be employed to mount a boring machine on engines having varying angular relationhisp between the axes of the cylinder bores and the face of the cylinder block, without modification or change in the fixture. By employing one of the cylinder bores as a reference point, the spindle of the boring machine is automatically aligned with the axes of the cylinder bores when the boring machine is mounted on such fixture.

It will be apparent that other and further forms of my invention may be devised without departing from the spirit and scope of the appended claims.

I claim:

1. In a mounting device for a cylinder boring machine; a plate; a body portion depending from the plate; a channel formed in the face of the body portion; a passage through the plate in communication with the channel; a wedging member disposed in the channel; co-engaging cam surfaces in the channel and on the wedging member arranged to cause movement of the wedging member outwardly of the channel when the wedging member is moved vertically in the channel; a pivot carried by the wedging member; and a lead screw suspended in the passage and extending through the channel and being threadedly engaged with the pivot, whereby upon rotation of the lead screw the wedging member is caused to move along the channel.

2. The combination called for in claim 1 wherein means is provided on the upper face of the plate for attachment of a boring machine thereto.

3. The combination called for in claim 1 wherein the plate has semi-circular recesses formed in each end thereof.

4. The combination called for in claim 1 wherein the depending body has a pair of spaced longitudinal bosses formed on the face thereof opposite the channel.

5. The combination called for in claim 1 wherein the wedging member has a rounded outer face thereon.

6. The combination called for in claim 1 wherein the passage is greater in diameter than the lead screw to provide a clearance for lateral movement of the lead screw.

7. In a device of the class described a head member having a flat upper face and a passage therethrough; a depending body portion attached to the head member; a wedge member having a tapered surface thereon; a tapered surface arranged on the body coinciding with the tapered surface on the wedge member; a lead screw rotatably extending through the head member and being suspended thereto; a pin pivoted to the wedge member, having a threaded passage therethrough; and a threaded outer end on the lead screw threadedly engaged through the passage in the pivot pin, whereby when the lead screw is rotated the wedge member is caused to move along the tapered surfaces.

8. The combination called for in claim 7 wherein the wedge member is recessed in a channel formed in the surface of the body portion and the lead screw extends through said channel.

9. The combination called for in claim 7 wherein the lead screw is recessed in a channel provided in a face of the body portion and the passage through the head member is enlarged to permit the lead screw to move laterally with relation to the head member as the wedge member moves laterally with relation to the body portion.

10. The combination called for in claim 7 wherein the passage includes a counterbore and the lead screw has an enlarged head thereon suspended in the counterbore.

11. The combination called for in claim 10 with the addition of means for pivotally mounting the enlarged head in the counter bore.

References Cited in the file of this patent

UNITED STATES PATENTS

| | | |
|---|---|---|
| 681,090 | White | Aug. 20, 1901 |
| 1,220,399 | Cowell | Mar. 27, 1917 |
| 1,922,630 | Oberhuber | Aug. 15, 1933 |
| 2,034,488 | Rottler | Mar. 17, 1936 |